US 11,984,816 B2

(12) United States Patent
Nakahara et al.

(10) Patent No.: US 11,984,816 B2
(45) Date of Patent: May 14, 2024

(54) POWER CONVERSION DEVICE AND PRESS APPARATUS

(71) Applicant: Hitachi Industrial Equipment Systems Co., Ltd., Tokyo (JP)

(72) Inventors: Mizuki Nakahara, Tokyo (JP); Hirooki Tokoi, Tokyo (JP); Kimihisa Furukawa, Tokyo (JP); Yuki Kawaguchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 260 days.

(21) Appl. No.: 17/771,917

(22) PCT Filed: Apr. 16, 2020

(86) PCT No.: PCT/JP2020/016700
§ 371 (c)(1),
(2) Date: Apr. 26, 2022

(87) PCT Pub. No.: WO2021/090522
PCT Pub. Date: May 14, 2021

(65) Prior Publication Data
US 2022/0385204 A1    Dec. 1, 2022

(30) Foreign Application Priority Data
Nov. 6, 2019   (JP) .................................. 2019-201197

(51) Int. Cl.
*H02M 7/219*        (2006.01)
*B21D 37/00*        (2006.01)
(Continued)

(52) U.S. Cl.
CPC .............. *H02M 7/25* (2013.01); *B21D 37/00* (2013.01); *B30B 15/0041* (2013.01);
(Continued)

(58) Field of Classification Search
CPC ...... H02M 7/219; H02M 7/25; H02M 1/0009; H02M 5/44; H02P 27/06; B21D 37/00; B30B 15/0041; B30B 15/148
See application file for complete search history.

(56) References Cited

U.S. PATENT DOCUMENTS 9,912,252 B2 * 3/2018 Yu .......................... H02M 7/125
10,218,287 B2 * 2/2019 Satou ................... H02M 1/4225
(Continued)

FOREIGN PATENT DOCUMENTS

JP    2005-137168 A    5/2005
JP    2013-225998 A    10/2013
(Continued)

OTHER PUBLICATIONS

International Search Report (PCT/ISA/210) issued in PCT Application No. PCT/JP2020/016700 dated Jul. 21, 2020 with English translation (four (4) pages).
(Continued)

*Primary Examiner* — Adolf D Berhane
(74) *Attorney, Agent, or Firm* — Crowell & Moring LLP (57) ABSTRACT

A power conversion device and a press apparatus capable of preventing an excessive current in a DC-link capacitor are provided. The power conversion device 10 includes a voltage-doubling rectifier circuit 12. In the voltage-doubling rectifier circuit 12, in a voltage-doubling rectification mode, a common connection node Nc between two capacitors 102*a* and 102*b* is connected to a predetermined node. A current detector circuit 107 detects a switching current (IL) flowing in the switching elements SW1 and SW2, and a current detector circuit 108 detects a load current Ild of a load 15. In a mode switching period from a full-wave rectification mode to a voltage-doubling rectification mode, a controller circuit 110 controls the switching of the switching elements
(Continued)

SW1 and SW2, based on the switching current (IL) and the load current Ild.

8 Claims, 8 Drawing Sheets

(51) Int. Cl.
    *B30B 15/00*     (2006.01)
    *B30B 15/14*     (2006.01)
    *H02M 1/00*     (2006.01)
    *H02M 5/44*     (2006.01)
    *H02M 7/25*     (2006.01)
    *H02P 27/06*     (2006.01)

(52) U.S. Cl.
    CPC ......... *B30B 15/148* (2013.01); *H02M 1/0009* (2021.05); *H02M 5/44* (2013.01); *H02P 27/06* (2013.01)

(56) References Cited

U.S. PATENT DOCUMENTS

| 2018/0367058 A1 | 12/2018 | Satou et al. |
| 2020/0086372 A1* | 3/2020 | Masato ................ B21D 28/002 |
| 2023/0238897 A1* | 7/2023 | Nakahara .......... H02M 7/53871 |
| | | 318/504 |

FOREIGN PATENT DOCUMENTS

| JP | 2017-121162 A | 7/2017 |
| JP | 2018-174642 A | 11/2018 |

OTHER PUBLICATIONS

Japanese-language Written Opinion (PCT/ISA/237) issued in PCT Application No. PCT/JP2020/016700 dated Jul. 21, 2020 (three (3) pages).

* cited by examiner

POWER CONVERSION DEVICE AND PRESS APPARATUS

TECHNICAL FIELD

The present invention relates to a power conversion device and a press apparatus, and relates to, for example, a power conversion device including a voltage-doubling rectifier circuit and a press apparatus including the power conversion device.

BACKGROUND ART

A Patent Document 1 describes a voltage-doubling rectifier circuit that includes a rectifier circuit, an inductor, two series-connected switching elements, two-series connected DC-link capacitors, and an anti-backflow diode, and that is able to switch a full-wave rectification mode and a voltage-doubling rectification mode. In the voltage-doubling rectification mode, a direct electric current that is substantially double that of the full-wave rectification mode is output. In this circuit, the switching from the full-wave rectification mode to the voltage-doubling rectification mode causes a risk of flow of excessive inrush current in the switching elements or others since electric charges are rapidly stored in the DC-link capacitors. Therefore, this circuit is provided with a current detector detecting an electric current flowing in the inductor and a switching controller controlling the switching elements so that this electric current is within a predetermined range.

RELATED ART DOCUMENT

Patent Document

Patent Document 1: Japanese Patent Application Laid-Open Publication No. 2018-174642

SUMMARY OF THE INVENTION

Problems to be Solved by the Invention

For example, a power conversion device converting a direct-current voltage (direct-current power) to an alternating-current voltage (alternating-current power) is widely used in order to control a variable speed of a motor or others. Such a power conversion device generally includes a rectifier circuit converting a commercial power supply (three-phase alternating-current voltages of 200 V or others) to a direct-current voltage, and an inverter circuit outputting three-phase alternating-current voltages having optional voltage and frequency in response to the direct-current voltage. The rectifier circuit is often a full-wave rectifier circuit performing full-wave rectification to the three-phase alternating-current voltages output from the commercial power supply. In this case, an amount of the direct-current voltage output from the rectifier circuit is substantially the square root of two times an effective value of an inter-wire voltage that is input to the rectifier circuit.

Generally, an upper limit of an output voltage of the inverter circuit is defined by an input direct-current voltage. Therefore, the inverter circuit cannot often sufficiently generate a necessary voltage for high-speed rotation of the motor, depending on an amount of the input direct-current voltage. Specifically, by increase in a rotational speed of the motor, an induced voltage is increased, but a driving current (and thus, a torque) is decreased. Therefore, in order to secure the necessary torque along with the high-speed rotation of the motor, it is necessary to input a higher direct-current voltage to the inverter circuit.

As a countermeasure against such a problem, it is conceivable to, for example, use a voltage-doubling rectifier circuit capable of switching the full-wave rectification mode and the voltage-doubling rectification mode that outputs the direct current having a double amount of that of the full-wave rectification mode as described in the Patent Document 1. Further, in order to prevent excessive current caused by the switching from the full-wave rectification mode to the voltage-doubling rectification mode, arrangement of a current detector and a switching controller as described in the Patent Document 1 is conceivable.

However, for example, if a regenerative power is caused from the motor to the voltage-doubling rectifier circuit at the time of such mode switching, the system of the Patent Document 1 has a risk of failing to prevent the excessive current. Specifically, the regenerative current due to the circuit power flows in the DC-link capacitors but does not flow in the inductor. Therefore, even if the electric current flowing in the inductor is limited within a predetermined range, the electric current flowing in the DC-link capacitors are not always limited, and the excessive current may be caused in the DC-link capacitors. A lifetime of a generally-used electrolytic capacitor is defined by a current ripple, and therefore, there is a risk of reduction in the lifetime because of the excessive current.

The present invention has been made in consideration of such circumstances, and a purpose of the present invention is to provide a power conversion device and a press apparatus capable of preventing the excessive current in the DC-link capacitors.

The above and other objects and novel characteristics of the present invention will be apparent from the description of the present specification and the accompanying drawings.

Means for Solving the Problems

The summary of the typical embodiment of the inventions disclosed in the present application will be briefly described as follows.

A power conversion device according to the typical embodiments of the present invention includes a voltage-doubling rectifier circuit. The voltage-doubling rectifier circuit includes a rectifier circuit, a DC-link capacitor, a switching element, first and second current detector circuits, and a controller circuit. The rectifier circuit rectifies, and thus, converts an input alternating-current voltage into a direct-current voltage. The DC-link capacitor includes first and second capacitors that are connected in series between paired output nodes, and, in a second rectification mode, retains a direct-current voltage that is substantially double a direct-current voltage in a first rectification mode as an output voltage of the paired output nodes. In the second rectification mode, the switching element connects a common connecting node between the first and second capacitors to a predetermined node so that each of the first and second capacitors is charged. The first current detector circuit detects a switching current flowing in the switching element, and the second current detector circuit detects a load current in a load connected to the paired output nodes. In a mode switching period from the first rectification mode to the second rectification mode, the controller circuit controls the switching of the switching element, based on the switching current and the load current.

Effects of the Invention

The effects obtained by the typical embodiments of the present inventions disclosed in the present application will be briefly described below. In a power conversion device including a voltage-doubling rectifier circuit, excessive current in a DC-link capacitor can be prevented.

BEST MODE FOR CARRYING OUT THE INVENTION

Hereinafter, the embodiments of the present invention will be described in detail with reference to the accompanying drawings. Note that the same components are denoted by the same reference symbols in principle throughout all the drawings for describing the embodiments, and the repetitive description thereof will be omitted.

First Embodiment

<<Configuration of Power Conversion Device>>

Figure 1:
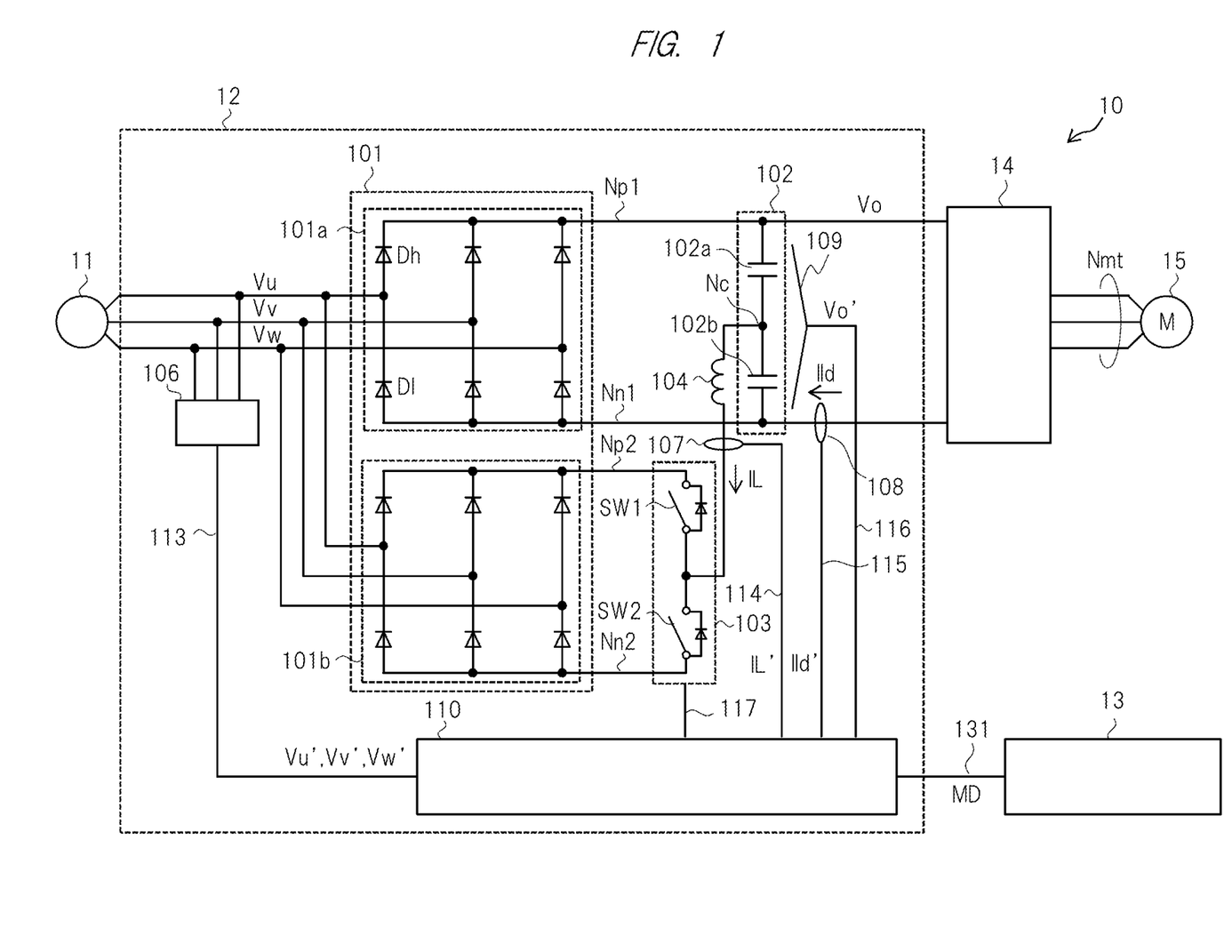
FIG. 1 is a circuit diagram showing a configuration example of a periphery of a power conversion device according to a first embodiment of the present invention.

FIG. 1 is a circuit diagram showing a configuration example of a periphery of a power conversion device according to a first embodiment of the present invention. FIG. 1 shows a three-phase alternating-current power supply 11, a voltage-doubling rectifier circuit 12, a host controller circuit 13, an inverter circuit (such as three-phase inverter circuit) 14, and a load (such as three-phase motor) 15. Among them, the voltage-doubling rectifier circuit 12 and the inverter circuit 14 configure a power conversion device 10. The voltage-doubling rectifier circuit 12 selectively operates in either a full-wave rectification mode or a voltage-doubling rectification mode, and, in the double-voltage rectification mode, outputs an output voltage Vo substantially having a double amount of a voltage of the full-wave rectification mode.

The voltage-doubling rectifier circuit 12 includes a rectifier circuit 101, a DC-link capacitor 102, a half bridge circuit (switching circuit) 103, an inductor 104, voltage sensors (voltage detector circuits) 106 and 109, current sensors (current detector circuit) 107 and 108, and a controller circuit (switching controller circuit) 110. The rectifier circuit 101 rectifies, and thus, converts alternating-current voltages (in this case, three-phase alternating-current voltages) Vu, Vv and Vw that are input from the three-phase alternating-current power supply 11. Specifically, in this case, the rectifier circuit 101 includes two diode bridges 101a and 101b.

When the diode bridge 101a independently operates, the full-wave rectification is performed to the three-phase alternating-current voltages (Vu, Vv and Vw) by an upper arm diode Dh and a lower arm diode Dl of each phase to charge the DC-link capacitor 102 at a full-wave rectification voltage. As described later, the diode bridge 101b charges the DC-link capacitor 102 at a voltage-doubling rectification voltage (substantially having the double amount of the full-wave rectification voltage) by making electric conduction between the upper arm diode Dh or the lower arm diode Dl of any phase of the diode bridge 101a and the lower arm diode Dl or the upper arm diode Dh of any phase of the diode bridge 101b.

The DC-link capacitor 102 includes two capacitors 102a and 102b that are connected in series between the paired output nodes (Np1 and Nn1) of the diode bridge 101a. In the full-wave rectification mode, as the output voltage Vo of the paired output nodes (Np1 and Nn1), the DC-link capacitor 102 retains the direct-current voltage that is output from the diode bridge 101a. On the other hand, in the voltage-doubling rectification mode, as the output voltage Vo, the DC-link capacitor 102 retains the direct-current voltage substantially having the double amount of that of the full-wave rectification mode through a later-described half bridge circuit 103.

In the voltage-doubling rectification mode, the half bridge circuit 103 connects a common connection node Nc between the two capacitors 102a and 102b to a predetermined node so that the two capacitors 102a and 102b inside the DC-link capacitor 102 are individually charged at the full-wave rectification voltage. In this example, the half bridge circuit 103 includes two switching elements SW1 and SW2 that are connected in series between paired output nodes (Np2 and Nn2) of the diode bridge 101b.

The switching element SW1 connects the common connection node Nc between the two capacitors 102a and 102b to one (Np2) of the paired output nodes of the diode bridge 101b through the inductor 104. On the other hand, the switching element SW2 connects the common connection node Nc to the other (Nn2) of the paired output nodes of the diode bridge 101b through the inductor 104.

Therefore, when the switching element SW1 is controlled to be turned ON, a charging path for the capacitor 102b through the inductor 104 is formed between the high-potential output node Np2 of the diode bridge 101b and the low-potential output node Nn1 of the diode bridge 101a. On the other hand, when the switching element SW2 is controlled to be turned ON, a charging path for the capacitor 102a through the inductor 104 is formed between the high-potential output node Np1 of the diode bridge 101a and the low-potential output node Nn2 of the diode bridge 101b. As a result, each of the capacitors 102a and 102b is charged nearly to an amplitude of an inter-wire voltage of the three-phase alternating-current voltage, and the output voltage Vo is substantially double the voltage in the full-wave rectification mode.

An effect caused by the arrangement of the inductor 104 will be described here. For example, when the voltage of the DC-link capacitor 102 is the full-wave rectification voltage, if the inductor 104 is not arranged, about the double voltage of the charging voltage (that is about ½ times the full-wave rectification-current voltage) is applied to the capacitor 102a by the switching ON state of the switching element SW2 (the switching OFF state of the switching element SW1), and therefore, the inrush current adversely flows in the capacitor 102a. In this case, if the inductor 104 is arranged, a change rate of the electric current can be reduced, and therefore, the inrush current in the capacitor 102a can be suppressed. The same goes for the capacitor 102b.

The voltage sensor 106 detects the three-phase alternating-current voltages Vu, Vv and Vw output from the three-phase alternating-current power supply 11, and outputs their detection values Vu', Vv' and Vw' to the controller circuit 110 through a signal line 113. The voltage sensor 109 detects the output voltage Vo of the paired output nodes of the voltage-doubling rectifier circuit 12 (in other words, the paired output nodes (Np1 and Nn1) connected to the DC-link capacitor 102), and outputs its detection value Vo' to the controller circuit 110 through a signal line 116.

The current sensor 107 detects a switching current flowing in the switching elements SW1 and SW2 by detecting an inductor current IL flowing in the inductor 104, and outputs its detection value IL' to the controller circuit 110 through a signal line 114. The current sensor 108 detects a load current Ild of the load 15 connected to the paired output nodes (Np1 and Nn1) of the voltage-doubling rectifier circuit 12 through the inverter circuit 14, and outputs its detection value Ild' to the controller circuit 110 through a signal line 115.

In this example, the current sensor 108 is arranged at a low-potential input node of the inverter circuit 14. However, the arrangement is not limited to this, and the current sensor 108 may be arranged at a position at which the load current Ild can be detected. In other words, the arrangement position of the current sensor 108 may be, for example, at a high-potential input node of the inverter circuit 14, inside the inverter circuit 14, at a driving node Nmt of the load (three-phase motor) 15, or others.

Note that the voltage sensors (voltage detector circuits) 106 and 109 may include, for example, a voltage divider resistor or others outputting an analog voltage that is in proportional to a detection target voltage within a predetermined voltage range, and besides, may include an analog-digital converter or others converting this analog voltage to have a digital value.

The controller circuit (switching controller circuit) 110 controls the switching of the switching elements SW1 and SW2 inside the half bridge circuit 103 through a signal line 117, based on each of the input detection values Vu', Vv', Vw', Vo', IL' and Ild' and an input mode switching signal MD. The mode switching signal MD is a signal for selecting the full-wave rectification mode or the voltage-doubling rectification mode.

Specifically, in the voltage-doubling rectification mode, the controller circuit 110 controls the switching (turning ON/turning OFF) of the half bridge circuit 103 (the switching elements SW1 and SW2), based on the voltage relation among the phases of the three-phase alternating-current voltages Vu, Vv and Vw. Further, particularly in the mode switching period from the full-wave rectification mode to the voltage-doubling rectification mode, the controller circuit 110 controls the switching of the switching elements SW1 and SW2, based on the inductor current (switching current) IL and the load current Ild (more strictly, each of the detection values IL' and Ild'). Specifically, the controller circuit 110 turns OFF both the switching elements SW1 and SW2 if needed. In the full-wave rectification mode, note that the controller circuit 110 fixes each of the switching elements SW1 and SW2 to be OFF.

The controller circuit 110 is typically made of a microcontroller or others. In this case, for example, the analog-digital converter or others inside the voltage sensors 106 and 109 and the current sensor 108 can be mounted inside the microcontroller. However, a part of or entire of the controller circuit 110 may be made of not only the microcontroller but FPGA (Field Programmable Gate Array), ASIC (Application Specific Integrated Circuit) or others. In other words, the controller circuit 110 may be appropriately made of a software, a hardware or combination of them.

Each of the switching elements SW1 and SW2 is made of, for example, an IGBT (Insulated Gate Bipolar Transistor), a MOSFET (Metal Oxide Semiconductor Field Effect Transistor), a thyristor or others. Each connection of the signal lines 113 to 117 is not always a wired connection but may be a wireless connection. In this example, the voltage sensor 106 detects the three-phase alternating-current voltages Vu, Vv and Vw. However, the detection is not limited to this. For example, the voltage sensor 106 may detect the inter-wire voltage of each phase or others.

As widely known, the inverter circuit (three-phase inverter circuit) 14 includes an upper switching element connected to each of the output node (driving node Nmt) of the three phases and the high-potential power supply input node (Np1), and a lower switching element connected to each of the output node of the three phases and the low-potential power supply input node (Nn1). In this manner, the inverter circuit 14 converts the output voltage Vo that is output from the voltage-doubling rectifier circuit 12, into the alternating-current voltage (three-phase alternating-current voltage) having optional voltage and frequency, and controls the load (such as the three-phase servomotor) 15 at this alternating-current voltage.

The host controller circuit 13 controls the operational sequence of the load (such as the three-phase servomotor) 15 or others, and outputs the mode switching signal MD to the voltage-doubling rectifier circuit 12 through a signal line 131, based on this operational sequence. Further, the host controller circuit 13 also performs, for example, a PWM (Pulse Width Modulation) control to the inverter circuit 14. The host controller circuit 13 is also typically made of a microcontroller or others.

<<Details of Controller Circuit>>

Figure 2:
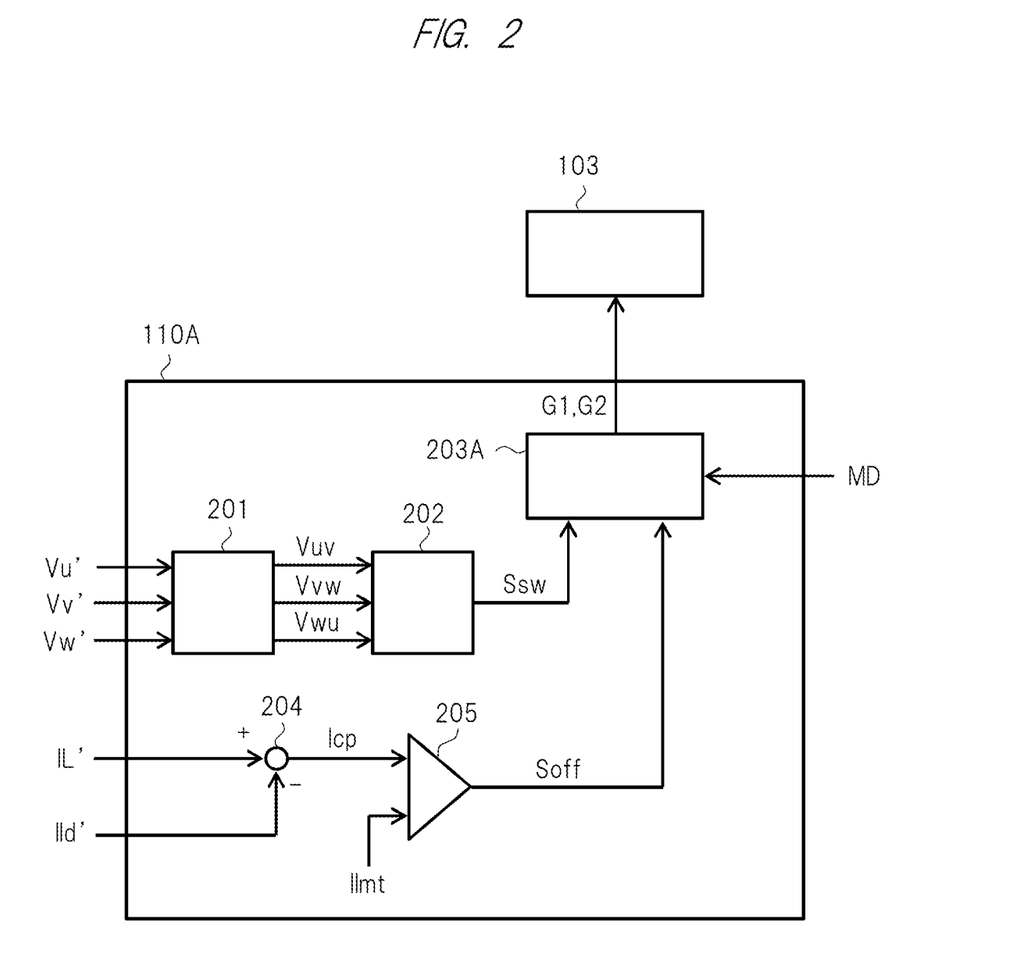
FIG. 2 is a block diagram showing a configuration example of a principal part of a controller circuit inside a voltage-doubling rectifier circuit.
Figure 3:
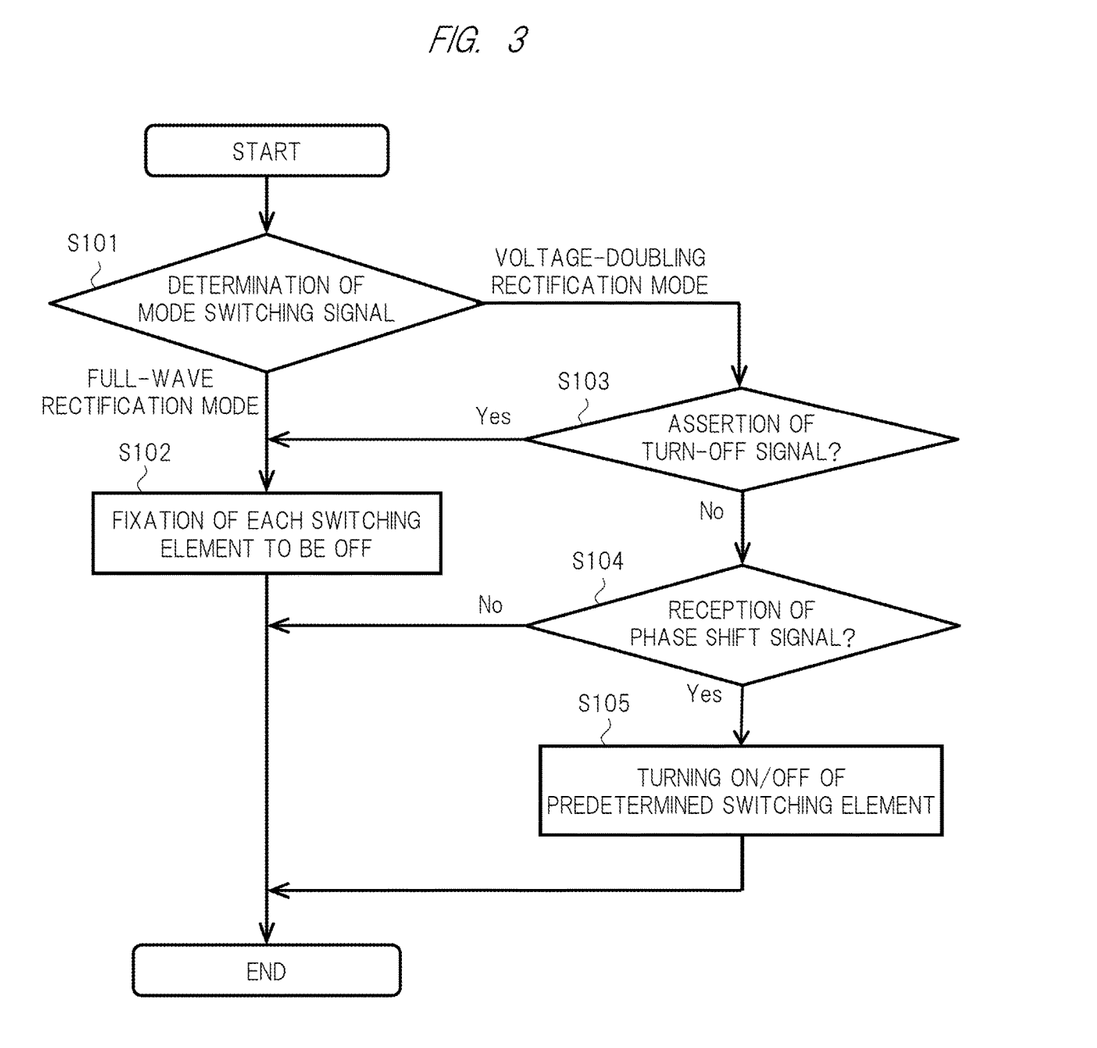
FIG. 3 is a flowchart showing an example of processing contents of a gate signal generator in FIG. 2.

FIG. 2 is a block diagram showing a configuration example of a principal part of the controller circuit inside the voltage-doubling rectifier circuit in FIG. 1. FIG. 3 is a flowchart showing an example of processing contents of a gate signal generator in FIG. 2. Briefly, a controller circuit 110A (110) of FIG. 2 calculates a capacitor current Icp flowing in the DC-link capacitor 102, based on the inductor current (switching current) IL (strictly its detection value IL') and the load current Ild (strictly its detection value Ild') in an acceleration direction or a regenerative direction. And, the controller circuit 110A controls the switching elements SW1 and SW2 by using gate signals G1 and G2 so that the calculated capacitor current Icp does not exceed a predetermined upper limit value Ilmt.

Specifically, the controller circuit 110A (110) includes an inter-wire voltage calculator 201, an inter-wire voltage comparator 202, a gate-signal comparator (switching-signal generator) 203A, an adder 204, and a current comparator 205. Each of these units is achieved by, for example, a program processing using a CPU (Central Processing Unit) inside the microcontroller or others.

The inter-wire voltage calculator 201 calculates values of an inter-wire voltage Vuv of the U-V phases, an inter-wire voltage Vvw of the V-W phases, and an inter-wire voltage Vwu of the W-U phases from the detection values Vu', Vv' and Vw' of the input three-phase alternating-current voltages. The inter-wire voltage comparator 202 compares absolute values of the respective inter-wire voltages Vuv, Vvw and Vwu, and selects a phase having the maximum inter-wire voltage. And, the inter-wire voltage comparator 202 outputs a phase shift signal Ssw at a timing at which the phase having the maximum inter-wire voltage shifts to another phase. Specifically, the phase having the maximum inter-wire voltage generally shifts for every period of 60° of the three-phase alternating-current voltages Vu, Vv and Vw. Because of this, the phase shift signal Ssw is output for every period of 60°.

The adder 204 calculates a value of the capacitor current Icp flowing in the DC-link capacitor 102 by adding the detection value IL' of the input inductor current (switching current) and the detection value Ild' of the load current (specifically, adding an opposite electricity of the detection value Ild'). In this example, the detection value Ild' of the load current has positive electricity in the acceleration, and negative electricity in the regeneration. As a result, the value of the capacitor current Icp is low in the acceleration, and high in the regeneration. The current comparator 205 compares the value of the capacitor current Icp calculated by the adder 204 and the previously-set upper limit value Ilmt. The current comparator 205 outputs (asserts) a turning-OFF signal Soff when the value of the capacitor current Icp reaches the upper limit value Ilmt.

The gate-signal generator (switching-signal generator) 203A repeatedly executes, for example, a processing flow as shown in FIG. 3 for every predetermined control period. The predetermined control period is set to be sufficiently shorter (such as a period that is shorter by one digit or more or others) than the period of 60° of the three-phase alternating-current voltages. In FIG. 3, the gate-signal generator 203A determines which one of the full-wave rectification mode and the voltage-doubling rectification mode has been selected by the mode switching signal MD (step S101). If it is determined in the step S101 that the full-wave rectification mode has been selected, the gate-signal generator 203A fixes the switching elements SW1 and SW2 to be OFF by using the gate signals G1 and G2, and the process ends (step S102).

On the other hand, if it is determined in the step S101 that the voltage-doubling rectification mode has been selected, the gate-signal generator 203A determines whether the turning-OFF signal Soff has been output or not (asserted or not) (step S103). If it is determined in the step S103 that the turning-OFF signal Soff has been output, the gate-signal generator 203A fixes the switching elements SW1 and SW2 to be OFF in the step S102. If it is determined in the step S103 that the turning-OFF signal Soff has not been output (at the negate level), the gate-signal generator 203A determines whether the phase shift signal Ssw has been received or not (step S104).

If it is determined in the step S104 that the gate-signal generator 203A has received the phase shift signal Ssw, the gate-signal generator 203A turns ON/OFF the predetermined switching element SW1 or SW2 by using the gate signals G1 and G2, and the process ends (step S105). Specifically, in response to the phase shift signal Ssw, the gate-signal generator 203A alternately (complementarily) turns ON/OFF the switching elements SW1 and SW2 for, for example, every period of 60° of the three-phase alternating-current voltages Vu, Vv and Vw. On the other hand, if it is determined in the step S104 that the gate-signal generator 203A has not received the phase shift signal Ssw, the process ends.

As a specific example, it is assumed in the certain control period that the predetermined switching element (SW1 or SW2) is turned ON in response to the phase shift signal Ssw (steps S104 and S105). This switching element is turned OFF if the next phase shift signal Ssw is received in a subsequent control period (steps S104 and S105). However, this switching element is forcibly turned OFF if the turning-OFF signal Soff is output (if the capacitor current Icp reaches the upper limit value Ilmt) even before the reception of the next phase shift signal Ssw (steps S103 and S102).

As described above, the controller circuit 110A of FIG. 2 controls the switching of each of the switching elements SW1 and SW2 so that the capacitor current Icp does not exceed the predetermined upper limit value Ilmt. In this manner, in the voltage-doubling rectification mode (particularly in the mode switching period from the full-wave rectification mode to the voltage-doubling rectification mode), the excessive current is prevented from flowing in the DC-link capacitor 102 even if the regenerative current (that is the charging current) due to the regenerative power from the load 15 to the DC-link capacitor 102.

Note that various circuit systems (circuit topologies) of the voltage-doubling rectifier circuit 12 in FIG. 1 have been known. The control system based on the inductor current (switching current) IL and the load current Ild as shown in FIG. 2 is similarly applicable to each of these circuit systems. For example, the diode bridges (in other words, the full-wave rectifier circuits) 101a and 101b converting the three-phase alternating-current voltages into the direct-current voltage by performing the full-wave rectification are used as the rectifier circuit 101 in FIG. 1, but are variously replaceable with a member using, for example, a half-wave rectifier circuit in place of the full-wave rectifier circuit, a single phase in place of the three phases or others when the member is a rectifier circuit that rectifies the alternating-current voltage into the direct-current voltage.

In the assumption of the usage of the rectifier circuit 101 including the two diode bridges 101a and 101b in FIG. 1, the common connection node Nc of the DC-link capacitor 102 is connected to either one (101b) of the two diode bridges through the half bridge circuit 103. However, a destination of the connection of the common connection node Nc is appropriately changeable in accordance with the circuit system of the voltage-doubling rectifier circuit. For example, when a rectifier circuit made of one diode bridge is used as described in the Patent Document 1, the destination of the connection of the common connection node Nc may be the paired output nodes of this diode bridge through the half bridge circuit.

However, in comparison with, for example, the case of the usage of the circuit system of the Patent Document 1, the usage of the circuit system of FIG. 1 provides the following effect.

In the circuit system of the Patent Document 1, an additional circuit such as the inductor or the anti-backflow diode is arranged in the current path from this diode bridge to the DC-link capacitor in order to enable one diode bridge to perform the switching between the full-wave rectification mode and the voltage-doubling rectification mode. An originally-unnecessary loss is caused in the full-wave rectification mode since the electric current flows in this additional circuit even in the full-wave rectification mode. On the other hand, in the circuit system of FIG. 1, the loss as seen in the Patent Document 1 is not caused in the full-wave rectification mode since the original full-wave rectifier circuit (the circuit made of the diode bridge 101a and the DC-link capacitor 102) not including such an additional circuit is formed.

<<Operation of Voltage-Doubling Rectifier Circuit>>

Figure 4:
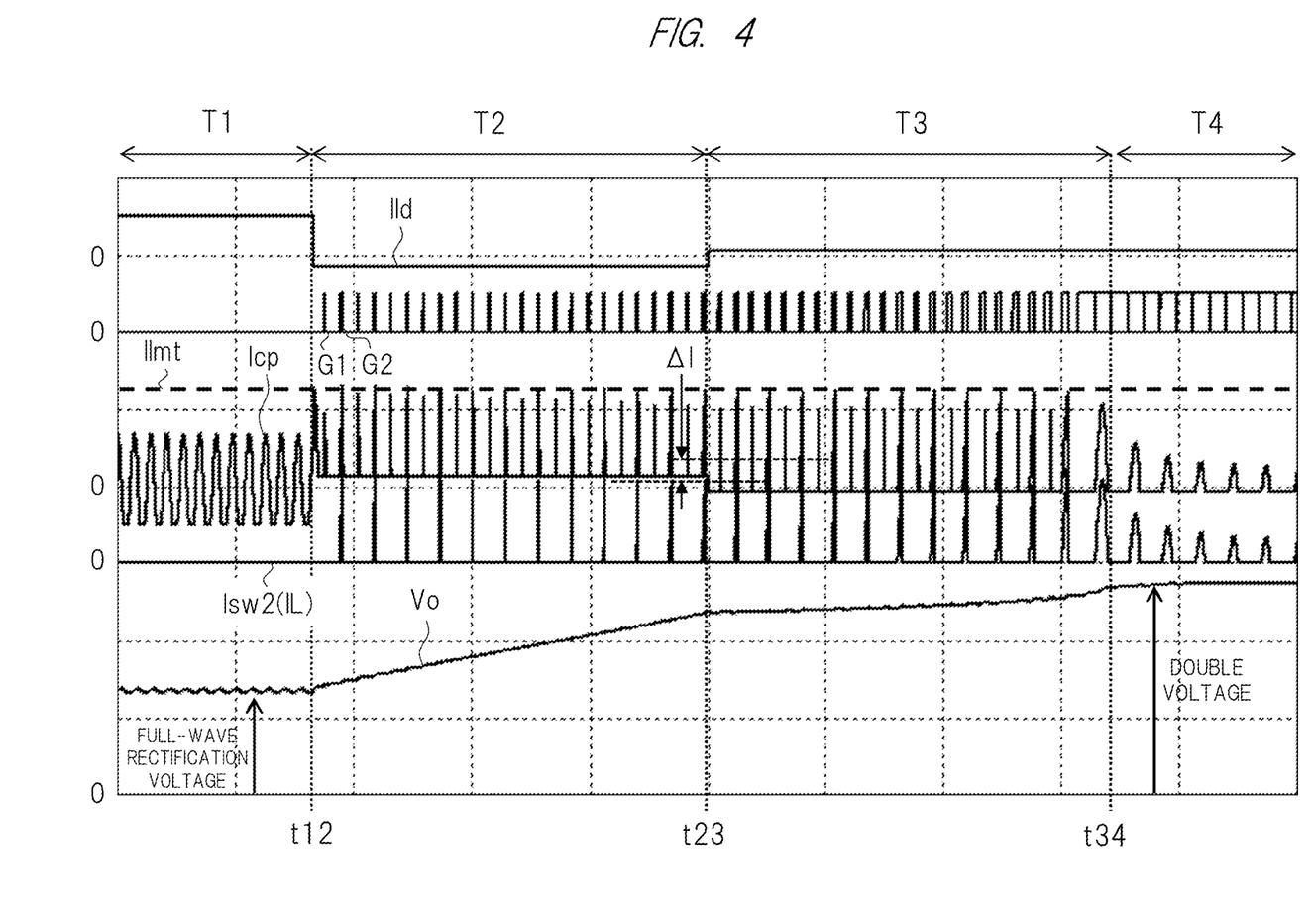
FIG. 4 is a waveform chart showing an operational example of the voltage-doubling rectifier circuit in FIGS. 1 and 2.

FIG. 4 is a waveform chart showing an operational example of the voltage-doubling rectifier circuit in FIGS. 1 and 2. FIG. 4 shows each waveform of the load current Ild, the gate signals G1 and G2, the capacitor current Icp, the switching current Isw2 of the switching element SW2 (the inductor current IL), and the output voltage Vo. Regarding the load current Ild, for example, a schematic waveform in which a high frequency component caused by the PWM control of the inverter circuit 14 is ignored is illustrated for simplification of the explanation. In this example, an electric current flowing in the capacitor 102a corresponding to the switching element SW2 is illustrated as the capacitor current Icp.

In a period T1, the voltage-doubling rectifier circuit 12 operates in the full-wave rectification mode, and the inverter circuit 14 performs the accelerating operation for supplying the power to the load 15. Therefore, the load current Ild flows in a positive direction (an arrow direction of Ild shown in FIG. 1). And, because of the full-wave rectification mode, the switching operation of the half bridge circuit 103 stops. Therefore, the gate signals G1 and G2 are at an OFF level ("L" level in this case), and the switching current Isw2 is zero. The capacitor current Icp is the electric current that has been subjected to the full-wave rectification by the diode bridge 101a, and is the necessary electric current for retaining the full-wave rectified voltage as the output voltage Vo.

Next, at a time t12, the voltage-doubling rectifier circuit switches the full-wave rectification mode to the voltage-doubling rectification mode in response to the mode switching signal MD. In this example, in a period T2 immediately after this switching, the regenerative power occurs from the load 15. In other words, in the period T2, the regenerative current flows from the load 15 to the DC-link capacitor 102 through the inverter circuit 14, and therefore, the load current Ild has the negative electricity.

In the period T2, the switching control in the half bridge circuit 103 is performed in response to the switching to the voltage-doubling rectification mode. Specifically, the gate signals G1 and G2 of the switching elements SW1 and SW2 are alternately output. In response to this, the switching current Isw2 flows, and the capacitor current Icp becomes a synthetic current of the switching current Isw2 and the load current (regenerative current) Ild. In this case, both the switching current Isw2 and the load current Ild flow in a direction of charging the capacitor 102a, and therefore, the capacitor current Icp is larger than the switching current Isw2.

Incidentally, as shown in FIG. 2, the capacitor current Icp is set to have the upper limit value Ilmt. When the capacitor current Icp reaches the upper limit value Ilmt as shown in FIG. 4, even if the switching current Isw2 is lower than the upper limit value Ilmt, the controller circuit 110A of FIG. 2 turns OFF the switching element SW2 by forcibly controlling the gate signal G2 to be at the OFF level ('L' level). Therefore, the excessive current in the capacitor 102a (similarly the capacitor 102b) can be prevented. Under the circumstances, in the period T2, the DC-link capacitor 102 is charged by the capacitor current Icp within the upper limit value Ilmt, and therefore, the output voltage Vo gradually increases from the full-wave rectification voltage in the period T1.

Subsequently, at a time t23, the regenerative power does not occur from the load 15, and the period shifts from the period T2 that is the regenerative period to a period T3 that is the acceleration period. In the period T3, the load current Ild has the positive electricity again because of the acceleration. In the period T3, to the DC-link capacitor 102, the switching elements SW1 and SW2 need to supply the current because of the acceleration in addition to the current because of the voltage doubling (voltage rising). Therefore, as shown in FIG. 4, the switching current Isw2 increases by "ΔI" in comparison with the case of the period T1. As a result, even in the period T3, the excessive current may be caused in the DC-link capacitor 102.

Therefore, even in the period T3, the controller circuit 110A of FIG. 2 controls the switching of the switching elements SW1 and SW2 so that the capacitor current Icp does not exceed the upper limit value Ilmt as similar to the case of the period T2. In this manner, the excessive current in the capacitors 102a and 102b can be prevented. Since it is necessary in the period T3 to supply the load current Ild to the load 15 as different from the case of the period T2, a speed of the increase in the output voltage Vo is lower than the case of the period T2.

Next, at a time t34, the output voltage Vo reaches a double voltage (that is substantially a double voltage of the full-wave rectification voltage), and the period shifts to a period T4 that is a steady period. In this case, each of the periods T2 and T3 is the mode switching period from the full-wave rectification mode to the voltage-doubling rectification mode (in other words, a period of rising from the full-wave rectification voltage to the double voltage). The voltage rising is completed at the period T4, and therefore, the electric current corresponding to the load current Ild flows in the DC-link capacitor 102. Therefore, the capacitor current Icp in the period T4 is lower than the case of the period T3 and does not generally reach the upper limit value Ilmt. As a result, the gate signals G1 and G2 are not forcibly turned OFF as shown in FIG. 4, and are periodically switched in response to the phase shift signal Ssw of FIG. 2.

As described above, in the controller circuit 110A in FIG. 2, it is only necessary to make the switching control using the upper limit value Ilmt enabled at least in the mode switching periods (periods T2 and T3). However, in the controller circuit 110A in practice, the switching control using the upper limit value Ilmt may be enabled in periods (periods T2 to T4) for selecting the voltage-doubling rectification mode including the period T4.

<<Main Effect of First Embodiment>>

By the usage of the power conversion device of the first embodiment as described above, the excessive current in the DC-link capacitor 102 can be typically prevented. And, the output voltage Vo can be risen along with the prevention of the excessive current in the DC-link capacitor 102. As a result of the prevention of the excessive current, reliability of the power conversion device 10, and besides, reliability of a system including this device can be improved. And, for example, in the case of the usage of the system of the Patent Document 1, while the excessive current can be prevented in the acceleration period such as the period T3 of FIG. 4, the excessive current may not be possibly prevented in the regenerative period such as the period T2. By the usage of the system of the first embodiment, the excessive current can be prevented even in the regenerative period in addition to the acceleration period.

Second Embodiment

<<Outline of Press Apparatus>>

Figure 5A:
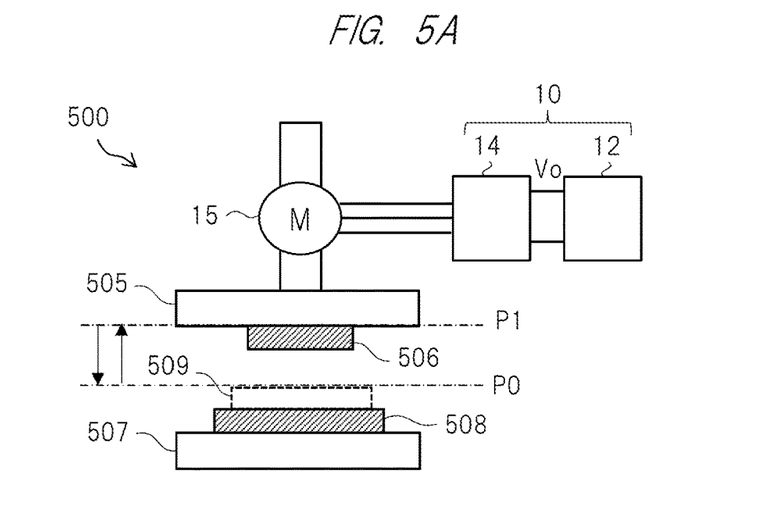
FIG. 5A is a schematic diagram showing a configuration example of a press apparatus according to a second embodiment of the present invention.
Figure 5B:
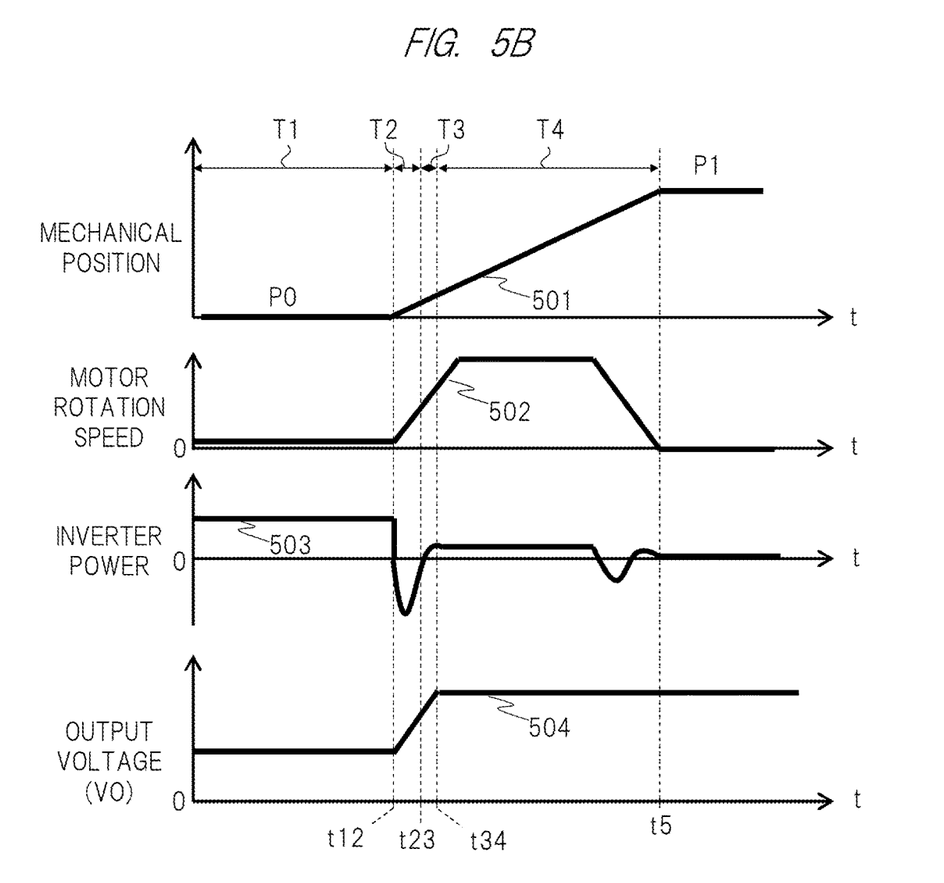
FIG. 5B is a time chart showing an example of a control operation of the press apparatus of FIG. 5A.

FIG. 5A is a schematic diagram showing a configuration example of a press apparatus according to a second embodiment of the present invention. FIG. 5B is a time chart showing an example of a control operation of the press apparatus of FIG. 5A. A press apparatus 500 of FIG. 5A includes a slide 505, a bolster 507, the motor (servomotor) 15, and the power conversion device 10. A lower mold 508 is attached to the bolster 507, and a target workpiece 509 is placed to interpose the lower mold 508. The slide 505 is arranged to face the bolster 507 across the target workpiece 509. An upper mold 506 is attached to the slide 505.

The motor (servomotor) 15 controls a distance between the bolster 507 and the slide 505 by moving the slide 505 (upward and downward) in a range between a standby position P1 and a press position P0. As shown in FIG. 1, the power conversion device 10 includes the voltage-doubling rectifier circuit 12 and the inverter circuit 14 to control the rotation of the motor 15. The target workpiece 509 is processed into a predetermined shape on the basis of shapes of the upper mold 506 and the lower mold 508 when the slide 505 is controlled to be positioned at the press position P0 by the motor 15.

FIG. 5B shows time-series changes of a mechanical position 501 (that is the position of the slide 505), a motor rotational speed 502, an inverter power 503, and the output voltage (Vo) 504. Periods T1 to T4 of FIG. 5B correspond to the periods T1 to T4 shown in FIG. 4. The period T1 is a period in which the target workpiece 509 is compressed, and the mechanical position 501 is the press position P0. Therefore, the motor rotational speed 502 is substantially zero. The poser conversion device 10 performs the acceleration operation for the compression, and the inverter power 503 has a positive electricity (acceleration). The voltage-doubling rectifier circuit 12 operates in the full-wave rectification mode, and the output voltage (Vo) 504 becomes the full-wave rectification voltage.

Next, the compression is completed at a time t12, and the period shifts to the period T2. The period T2 and a subsequent period are periods for returning the mechanical position 501 to the standby position P1. In this case, for improvement of throughput, it is desirable to increase the motor rotational speed 502 to rapidly return the mechanical position to the standby position P1. However, the increase in the motor rotational speed 502 causes increase in an induced voltage. Therefore, an upper limit of the motor rotational speed 502 is limited by an amount of the output voltage (Vo) 504 (the input voltage of the inverter circuit 14) to prevent the speed acceleration to a target speed in some cases. Accordingly, at the time t12, the mode is switched from the full-wave rectification mode to the voltage-doubling rectification mode. In response to this, the voltage-doubling rectifier circuit 12 starts rising the output voltage (Vo) 504.

On the other hand, in the period T2, the inverter power 503 has a negative electricity, and the regenerative power from the motor 15 to the inverter circuit 14 is generated. This phenomenon is called spring back, and is caused by a function of an elastic force from the target workpiece 509 to the slide 505 at the time of the stop of the compression at the time t12. By the generation of the regenerative power in the mode switching period (voltage rising period) to the voltage-doubling rectification mode, the excessive current may be caused in the DC-link capacitor 102 of FIG. 1 as described in FIG. 4. This excessive current can be prevented by the usage of the system of the first embodiment.

Subsequently, at a time t23, the regenerative power becomes zero, and the period proceeds to the period T3. In the period T3, the inverter power 503 has the positive electricity (acceleration) in order to elevate the mechanical position 501 to the standby position P1. In this case, as different from the case of the period T1, it is unnecessary to compress the target workpiece 509 but only necessary to elevate the mechanical position 501, and therefore, the inverter power 503 is reduced. However, even in the period T3, the excessive current may be caused in the DC-link capacitor 102 of FIG. 1 as described in FIG. 4. This excessive current can be prevented by the usage of the system of the first embodiment.

Next, at time t34, the output voltage (Vo) 504 reaches the double voltage (in other words, the voltage rising is completed), and the period shifts to the period T4. In the period T4, the motor 15 can be rotated at a high rotational speed since the output voltage (Vo) 504 is the double voltage, and the mechanical position 501 can be rapidly elevated to the standby position P1. Then, at time t5, the mechanical position 501 reaches the standby position P1. In response to this, the rotational driving of the motor 15 is stopped, and a sequence of the operation ends.

In the period T4, note that the regenerative power may be also caused immediately before the time t5 by the reduction in the speed of the motor 15. However, in this case, the voltage doubling of the output voltage (Vo) 504 is already completed at this time as different from the period T2, and therefore, it is unnecessary to supply the charge current for the voltage doubling (voltage rising) to the DC-link capacitor 102 of FIG. 1. Therefore, the excessive current in the DC-link capacitor 102 is not generally caused.

<<Main Effect of Second Embodiment>>

By the usage of the press apparatus of the second embodiment as described above, the same effect as that of the first embodiment can be provided. Further, the press apparatus 500 can be efficiently operated (at a high throughput) along with the prevention of the excessive current in the DC-link capacitor 102 inside the power conversion device 10. Since the excessive current can be prevented, reliability of the press apparatus 500 including the power conversion device 10 can be improved.

In this case, when the voltage-doubling rectifier circuit 12 of FIG. 1 is used, there is a concern about increase in a circuit area due to the addition of the diode bridge 101b in comparison to, for example, the circuit system of the Patent Document 1. However, for example, in application of the press apparatus 500 as described above, the inverter power 503 needed in the voltage-doubling rectification mode may be small as shown in the period T4 of FIG. 5B. Therefore, the diode bridge 101b can be made with a smaller size than that of the diode bridge 101a. As a result, the increase in the circuit area can be suppressed.

Third Embodiment

<<Details of Controller Circuit>>

Figure 6:
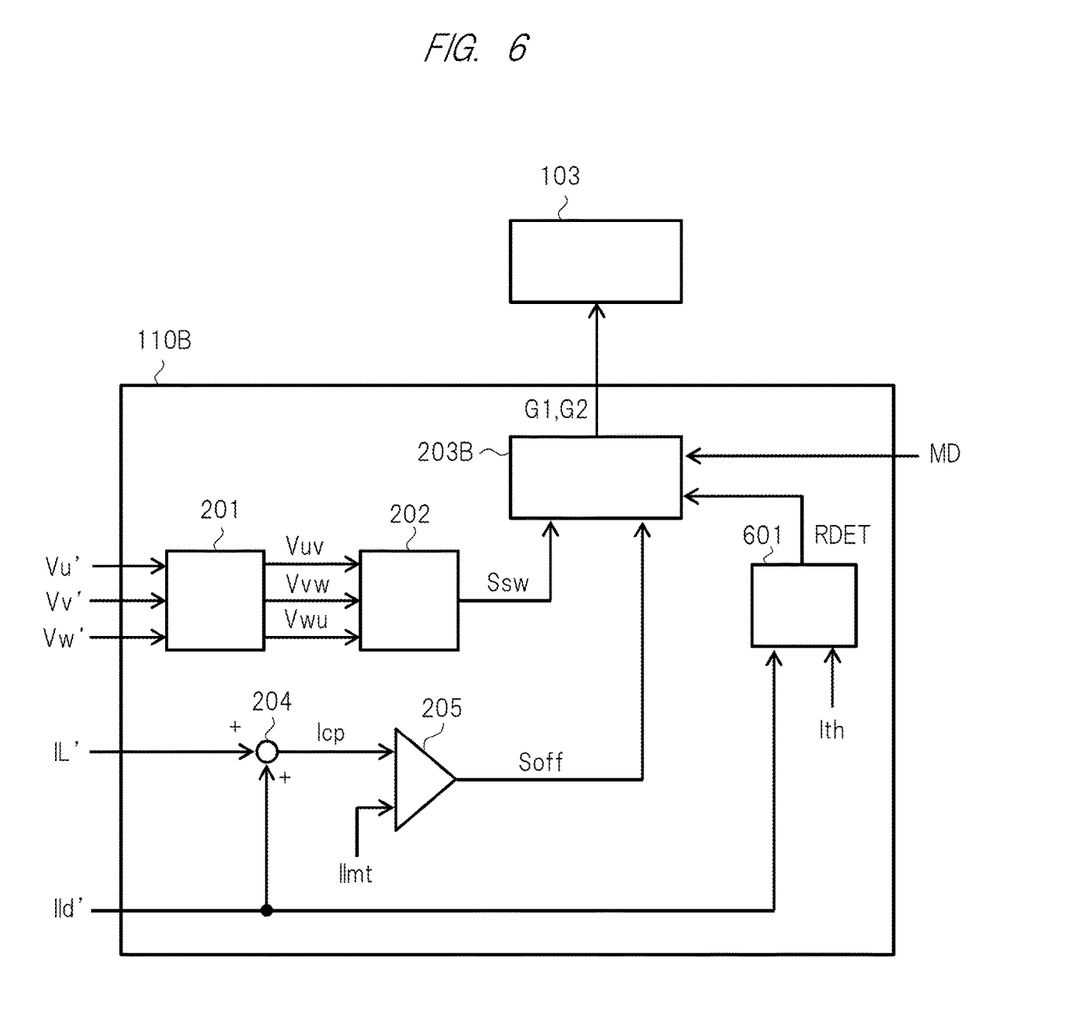
FIG. 6 is a block diagram showing a configuration example of a principal part of a controller circuit of the voltage-doubling rectifier circuit of FIG. 1 in a power conversion device according to a third embodiment of the present invention.
Figure 7:
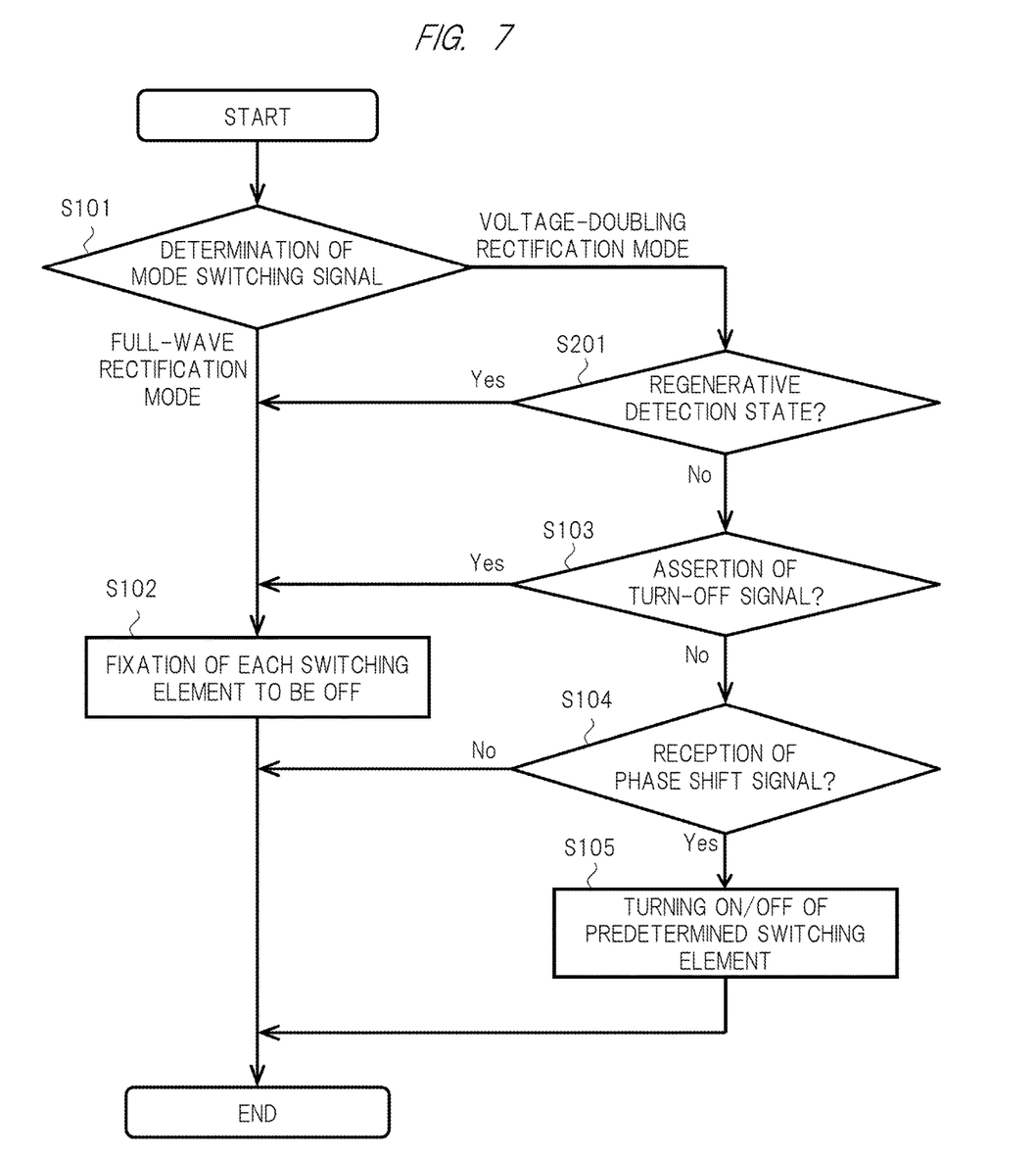
FIG. 7 is a flowchart showing an example of processing contents of a gate signal generator in FIG. 6.

FIG. 6 is a block diagram showing a configuration example of a principal part of the controller circuit in the voltage-doubling rectifier circuit of FIG. 1 in a power conversion device according to a third embodiment of the present invention. FIG. 7 is a flowchart showing an example of processing contents of a gate-signal generator of FIG. 6.

A controller circuit 110B shown in FIG. 6 further includes a regenerative detector circuit 601 in addition to the configuration example of FIG. 2. Along with this, the controller circuit 110B includes a gate-signal generator (switching-signal generator) 203B that is slightly different in the operation from that of the case of FIG. 2.

The regenerative detector circuit 601 determines whether the load current Ild flows in the regenerative direction (in other words, the load current is the regenerative current) or not and the regenerative current is larger than predetermined threshold value Ith or not. If the regenerative current is larger than the threshold value Ith, the regenerative detector circuit 601 outputs (asserts) a regenerative detection signal RDET. If the regenerative current is smaller than the threshold value Ith, the regenerative detector circuit 601 does not output (negates) the regenerative detection signal RDET.

The gate-signal generator 203B turns OFF the switching elements SW1 and SW2 by making the switching control disabled at the time of the output (assertion level) of the regenerative detection signal RDET in the period for selecting the voltage-doubling rectification mode (particularly the mode switching period from the full-wave rectification mode to the voltage-doubling rectification mode) in accordance with the mode switching signal MD. On the other hand, the gate-signal generator 203B makes the switching control enabled at the time of the non-output (negation level) of the regenerative detection signal RDET therein. Specifically, the gate-signal generator 203B performs processes as shown in FIG. 7. In the flow shown in FIG. 7 in comparison to the flow shown in FIG. 3, a step S201 is inserted between the step S101 and the step S103.

If the voltage-doubling rectification mode is selected in the step S101, the gate-signal generator 203B determines in the step S201 whether the regenerative state is detected or not. In other words, the gate-signal generator 203B determines whether the regenerative detection signal RDET is output or not (at the assertion level or the negation level). If the regenerative detection signal RDET is at the assertion level, the gate-signal generator 203B makes the switching control disabled, and fixes the switching elements SW1 and SW2 to be OFF by using the gate signals G1 and G2. On the other hand, if the regenerative detection signal RDET is at the negation level, the gate-signal generator 203B makes the switching control enabled, and the process shifts to the process of the step S103.

Figure 8:
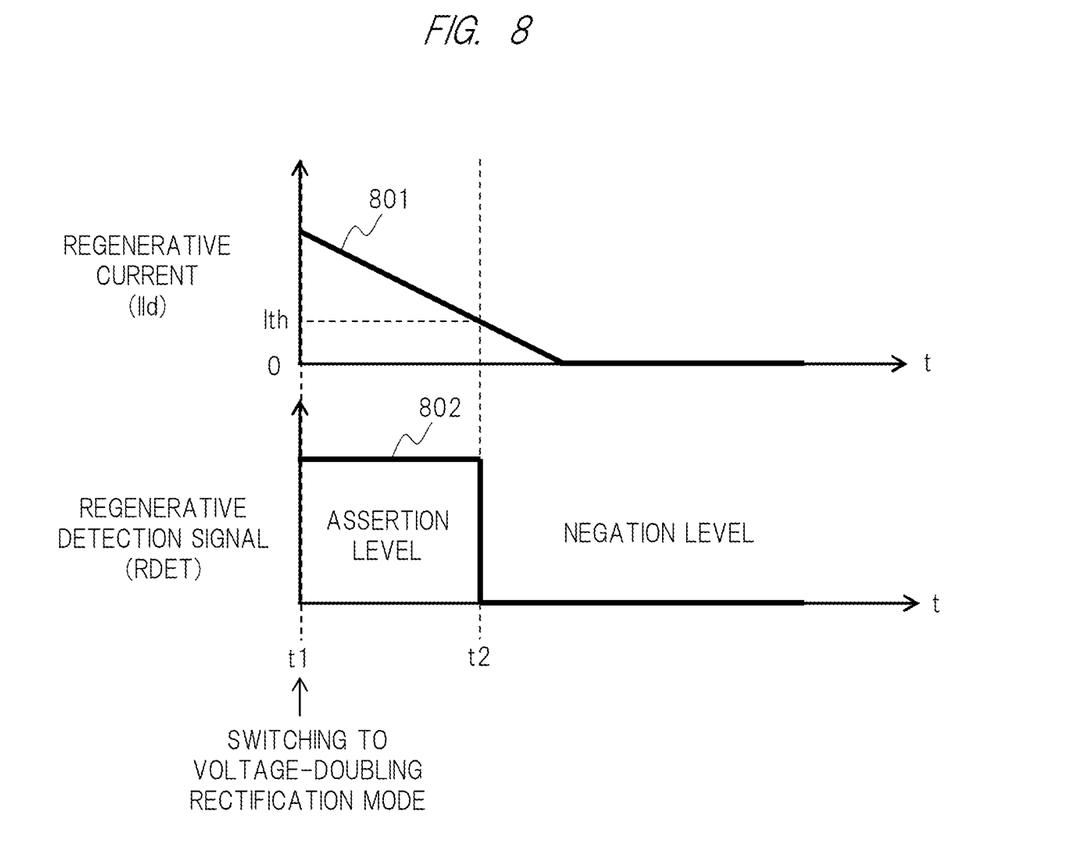
FIG. 8 is a time chart showing an example of a control operation of the controller circuit of FIG. 6.

FIG. 8 is a time chart showing an example of a control operation performed by the controller circuit of FIG. 6. The time chart of FIG. 8 is a time chart corresponding to, for example, the periods T2 and T3 of FIGS. 4 and 5B. In an example of FIG. 8, the voltage-doubling rectification mode is selected at the time t1, and a regenerative current (that is the load current Ild having the negative electricity) 801 is larger than the threshold value Ith in a period between the time t1 and the time t2. In this period, the regenerative detector circuit 601 asserts a regenerative detection signal (RDET) 802, and thus, the gate-signal generator 203B makes the switching control disabled.

On the other hand, in a period after the time t2, the regenerative current 801 is smaller than the threshold value Ith. In this period, the regenerative detector circuit 601 negates the regenerative detection signal (RDET) 802, and thus, the gate-signal generator 203B makes the switching control enabled. When making the switching control enabled, the gate-signal generator 203B performs the switching control so that the capacitor current Icp does not exceed the upper limit value Ilmt as similar to the case of the first embodiment.

<<Main Effect of Third Embodiment>>

By the usage of the power conversion device of the third embodiment as described above, the same effect as that of the first embodiment can be provided. Further, the regenerative current can be effectively used for rising the output voltage Vo in comparison to the case of the first embodiment, and therefore, the switching current caused by the switching control can be made zero in the period (the period between the time t1 and the time t2 in FIG. 8) in which the voltage is risen only by the regenerative current. As a result, the efficiency of the power conversion device can be enhanced. Incidentally, for example, in the period T2 of FIG. 4, while the system of the first embodiment controls the capacitor current Icp to be the upper limit value Ilmt, the system of the third embodiment generally controls this to be lower than the upper limit value Ilmt. Therefore, the system of the first embodiment is more effective for shortening the voltage-rising period (the periods T2 and T3 in FIG. 4).

In the foregoing, the invention made by the present inventors has been concretely described on the basis of the embodiments. However, the present invention is not limited to the foregoing embodiments, and various modifications can be made within the scope of the present invention. For example, the above-described embodiments have been explained in details for easily understanding the present invention, and are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

For example, this specification describes the application example of the power conversion device to the press apparatus. However, the application is of course not limited to this, and the power conversion device is similarly applicable to various apparatuses (systems) operating while appropriately switching the full-wave rectification mode and the voltage-doubling rectification mode and being able to generate the regenerative power from the load. In this case, particularly when the load is the motor, the regenerative power is easy to be generated.

EXPLANATION OF REFERENCE CHARACTERS

10 . . . power conversion device, 12 . . . voltage-doubling rectifier circuit, 14 . . . inverter circuit, 15 . . . load, 101 . . . rectifier circuit, 101a and 101b . . . diode bridge, 102 . . . DC-link capacitor, 102a and 102b . . . capacitor, 103 . . . half bridge circuit, 104 . . . inductor, 106 and 109 . . . voltage sensor (voltage detector circuit), 107 and 108 . . . current sensor (current detector circuit), 110, 110A and 110B . . . controller circuit, 500 . . . press apparatus, 505 . . . slide, 507 . . . bolster, SW1 and SW2 . . . switching element, MD . . . mode switching signal, Nc . . . common connection node, Np1, Np2, Nn1 and Nn2 . . . output node

The invention claimed is:

1. A power conversion device including a voltage-doubling rectifier circuit,
wherein the voltage-doubling rectifier circuit includes:
a rectifier circuit configured to rectify, and thus, convert an input alternating-current voltage into a direct-current voltage;
a DC-link capacitor configured to include first and second capacitors that are connected in series between paired output nodes, and configured to, in a second rectification mode, retain the direct-current voltage substantially having a double voltage in a first rectification mode as an output voltage of the paired output nodes;

a switching element configured to, in the second rectification mode, connect a common connection node between the first and second capacitors to a predetermined node so that each of the first and second capacitors is individually charged;

a first current detector circuit configured to detect a switching current flowing in the switching element;

a second current detector circuit configured to detect a load current of a load connected to the paired output nodes; and a controller circuit configured to, in a mode switching period from the first rectification mode to the second rectification mode, control the switching of the switching element, based on the switching current and the load current.

2. The power conversion device according to claim 1, wherein the controller circuit calculates a capacitor current flowing in the DC-link capacitor, based on the switching current and the load current in an acceleration direction or a regenerative direction, and controls the switching of the switching element so that the capacitor current does not exceed a predetermined upper limit value.

3. The power conversion device according to claim 2, wherein the controller circuit determines whether the load current is in the regenerative direction and is larger than predetermined threshold value in the mode switching period, and tunes OFF the switching element if the load current is larger than the predetermined threshold value, or makes the switching control of the switching element enabled if the load current is smaller than the predetermined threshold value.

4. The power conversion device according to claim 1, wherein the voltage-doubling rectifier circuit further includes an inductor, the rectifier circuit includes:
a first diode bridge configured to output the direct-current voltage to first paired output nodes by performing full-wave rectification to the input alternating-current voltage, and a second diode bridge configured to output the direct-current voltage to second paired output nodes by performing full-wave rectification to the input alternating-current voltage, and the DC-link capacitor is connected between the first paired output nodes, and the switching element includes:
a first switching element configured to connect the common connection node to one of the second paired output nodes through the inductor, and a second switching element configured to connect the common connection node to the other of the second paired output nodes through the inductor.

5. The power conversion device according to claim 1 further comprising:
an inverter circuit configured to convert the output voltage of the paired output nodes into an alternating-current voltage to control a motor by using the alternating-current voltage.

6. A press apparatus comprising:
a bolster where a target workpiece is placed;
a slide arranged to face the bolster across the target workpiece;
a servomotor configured to control a distance between the bolster and the slide by moving the slide; and
a power conversion device configured to include a voltage-doubling rectifier circuit and an inverter circuit, and control the servomotor,
wherein the voltage-doubling rectifier circuit includes:
a rectifier circuit configured to rectify, and thus, convert an input alternating-current voltage into a direct-current voltage;

a DC-link capacitor configured to include first and second capacitors that are connected in series between paired output nodes, and configured to, in a second rectification mode, retain the direct-current voltage substantially having a double voltage in a first rectification mode as an output voltage of the paired output nodes;

a switching element configured to, in the second rectification mode, connect a common connection node between the first and second capacitors to a predetermined node so that each of the first and second capacitors is individually charged;

a first current detector circuit configured to detect a switching current flowing in the switching element;

a second current detector circuit configured to detect a load current flowing in the servomotor; and a controller circuit configured to, in a mode switching period from the first rectification mode to the second rectification mode, control the switching of the switching element, based on the switching current and the load current, and the inverter circuit converts the output voltage of the paired output nodes into an alternating-current voltage to control the servomotor by using the alternating-current voltage.

7. The press apparatus according to claim 6, wherein the controller circuit calculates a capacitor current flowing in the DC-link capacitor, based on the switching current and the load current in an acceleration direction or a regenerative direction, and controls the switching of the switching element so that the capacitor current does not exceed a predetermined upper limit value.

8. The press apparatus according to claim 7, wherein the controller circuit determines whether the load current is in the regenerative direction and is larger than predetermined threshold value in the mode switching period, and tunes OFF the switching element if the load current is larger than the predetermined threshold value, or makes the switching control of the switching element enabled if the load current is smaller than the predetermined threshold value.

* * * * *